United States Patent Office 3,281,491
Patented Oct. 25, 1966

3,281,491
EPOXY RESIN ELASTOMERS
John C. Smith and Brad H. Miles, both of Lake Jackson, Tex., assignors to The Dow Chemical Company, Midland, Mich., a corporation of Delaware
No Drawing. Filed May 8, 1961, Ser. No. 108,289
5 Claims. (Cl. 260—830)

The invention relates to epoxy resin compositions. It particularly relates to such compositions which are elastomeric and flexible, especially adapted for lamination, and of high clarity suitable for use in laminating glass to be used for viewing purposes.

The term, epoxy resin, as used herein, has the generally accepted meaning, viz., a resin which employs an epoxide as an essential reactant in the preparation thereof. An epoxide is a compound containing an oxirane or ethoxyline group. In the preparation of epoxy resins, a resinous intermediate epoxide is usually prepared having an average of more than 1 oxirane group per molecule. A cured thermosetting resin product is formed by reacting the resinous intermediate epoxide with a compound having a functional group reactive with the oxirane groups or a compound which catalyzes a reaction between hydroxyl groups or between hydroxyl and oxirane groups of the resinous epoxide intermediate.

A desideratum exists for a resin having the general properties of known epoxy resins but which possesses, in addition thereto, sufficient clarity for optical purposes and which is elastomeric to a greater extent than known epoxy resins.

The invention provides an epoxy composition which is a clear, flexible resin, suitable for laminating, generally, and particularly suitable for laminating transparent plates or sheets to make laminar structures which are clear and transparent, and especially those where breakage, accompanied by shattering of the broken glass, without protective precautions, is possible. Among such glass requiring protection is the transparent face of cathode ray tubes, one of the most common examples of which is the television picture tube. The adhesive bond between the resin of the invention and a glass surface laminated thereto withstands the shock of implosion or explosion and thereby lessens the dangers associated with such shattering. The resin of the invention has high elongation and will stretch under force without breaking. It is dimensionally stable within wide ranges of temperature and humidity. Articles comprising plates or sheets laminated therewith withstand normal shipping, handling, and use without impairment of the properties of the resin or danger of separation of the plates or sheets therefrom.

The invention, accordingly, is a new epoxy resin, the method of making a laminated article comprising solid panels, plates, or sheets laminated by said resin, and the laminated article so made comprising substantially uniformly spaced-apart glass sheets having the intervening space therebetween filled with the resin composition of the invention.

The resin composition of the invention, broadly, is the reaction product of (A) a diepoxide or a diepoxide ether of a dihydric alcohol or of a dihydric phenol including higher molecular weight diepoxide polyethers of such alcohol or phenol containing repeating ether groups therein and (B) a monoepoxide or a monoepoxide ether, said composition being cured by admixing therewith a Lewis acid and a polyol, e.g., a polyoxyalkylene glycol.

The term "diepoxide" is used herein in the usual sense of including epoxides which have somewhat fewer than two oxirane groups per molecule. As used herein, the term includes epoxides having an average of from about 1.5 to 2.0 oxirane groups, and usually an average of about 1.7 and about 1.9 oxirane groups, per molecule. The invention may be practiced by employing, as the diepoxide component, both a relatively low molecular weight diepoxide ether (sometimes described as a substantially pure diepoxide ether) and a higher molecular weight diepoxide polyether, illustrated hereinafter. Between about 0.5 and 10 parts of the lower molecular weight diepoxide ether, per part by weight of the higher molecular weight diepoxide polyether, may advantageously be employed.

By judicious selection of the diepoxides and the monoepoxide components, preferably the ethers, as well as of the polyol, and employing an amount of Lewis acid to achieve the desired rate of cure, a resin can be made in accordance with the invention which provides the proper degree of strength, flexibility, and stability to satisfy a larger number of special uses.

Illustrative of a diepoxide ether of a polyhydric alcohol to employ in the practice of the invention are those encompassed by the following generic formula:

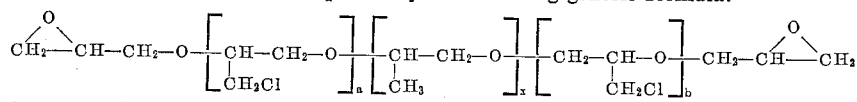

wherein $a$ and $b$ independently have a value from 0 to 1 and $x$ has a value of from 1 to such value that the compound has an epoxide equivalent weight of between 115 and about 450 an epoxide equivalent weight of about 330 commonly being employed. By epoxide equivalent weight is meant the number of grams of resin necessary to provide 1 oxirane or ethoxy-line group and is roughly one-half the molecular weight of a resin when the epoxide is predominately the diepoxide, as herein.

A diepoxide ether of the type about illustrated may be prepared by known methods, one of which is reacting polypropylene glycol with epichlorohydrin in the presence of a suitable catalyst, e.g., $BF_3$, dehydrohalogenating the chlorohydrin so made to form oxirane groups to produce the diepoxide ether and recovering the diepoxide ether by separating it from excess epichlorohydrin, water, and the NaCl formed during the reaction. The completeness with which chlorine or hydrogen chloride is removed from the epichlorohydrin or intermediate products during the reaction determines to what extent $a$ and/or $b$ have a value approaching 1 in the above formula.

Illustrative of diepoxides useful in the practice of the invention are vinylcyclohexenedioxide, dicyclopentadienedioxide and dipentenedioxide. Illustrative of diepoxide ethers of polyhydric phenol useful in the practice of the invention are diglycidyl ethers formed by reacting a halohydrin with an alkylidenediphenol, e.g., p,p′-isopropylidenediphenol (known as bisphenol A) said ether having the formula:

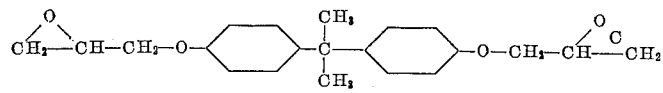

D.E.R. 331, having an epoxide equavilent weight of 187–193, and D.E.R. 332, having an epoxide equivalent weight of 174–179, are commercially available examples of such diglycidyl ethers, which contain minor amounts of polyethers.

The diglycidyl ether of bisphenol A, shown above, may be prepared by known methods. One method is that of reacting bisphenol A with a molar excess of epichlorohydrin, a molar ratio of between about 6 and 10 being preferred, while slowly adding an aqueous solution of NaOH thereto until a slight molar excess of NaOH, based on the bisphenol A, has been added.

When less than 2 moles of epichlorohydrin per mole of bisphenol a are employed, and particularly when a molar ratio not greatly exceeding 1 is employed, in the presence of at least an equimolar quantity of NaOH (rather than being added slowly thereto), a higher molecular weight diglycidyl polyether is prepared. In such case, the above formula of the diglycidyl ether of bisphenol A will be altered by containing repeating ether groups. Such higher molecular weight diepoxide ether, useful in the practice of the invention has the generic formula set out below:

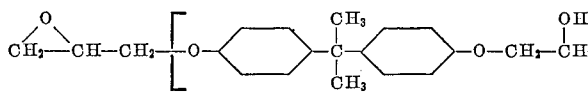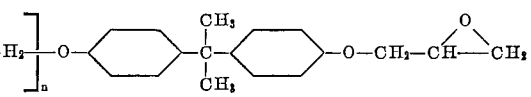

wherein $n$ may be from 1 to 8 or 10. For use in the practice of the invention $n$ usually has an average value such as to give an epoxide equivalent weight of between about 230 and about 1000. Illustrative of such higher molecular weight diepoxide polyethers are D.E.R. 661 having an epoxide equivalent weight of between 475 and 575 and D.E.R. 664 having epoxide equivalent weights of between 875 and 975.

The monoepoxide employed in the practice of the invention may be alkyl or aryl oxides, e.g., propylene oxide or styrene oxide or it may be a glycidyl ether having the generic formula:

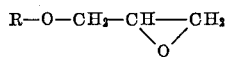

where R is an alkyl, aryl, or alkaryl group. Illustrative of compounds falling within this generic formula are butylglycidyl ether, phenylglycidyl ether, and tolylglycidyl ether.

The polyols employed with the Lewis acid curing agent in curing the composition comprising the diepoxide and the monoepoxide mixture as described above, include ethylene glycol, polymethylene glycols containing from 3 to about 7 methylene groups, and polyoxyalkylene glycols, e.g., polyethylene glycol and polypropylene glycol having a molecular weight of between about 250 and about 1200.

Methods of preparing polyols which are useful as curing agents in the practice of the invention are known. One method of preparing such polyol consists essentially of the following steps: An initiating material, such as water, propylene glycol, glycerol, or the like, is treated with an alkylene oxide, e.g., ethylene oxide or propylene oxide, in the presence of a basic catalyst, e.g., NaOH or KOH, at a temperature of from about 20° to 120° C. and at a pressure of from atmospheric to ca. 500 pounds per square inch (p.s.i.) until the desired molecular weight is obtained. The polyol so made, dependent upon the beginning reactants, is then separated from basic and volatile material.

Any Lewis acid may be employed to catalyze the cure in the practice of the invention. Illustrative of Lewis acid catalysts are $BF_3$, $SnCl_4$, $TeCl_3$, $AlCl_3$, and $ZnCl_2$.

The invention is carried out by admixing, in a suitable reaction vessel, provided with stirring and heating means, (A) the diepoxide component, e.g., the diglycidyl ether of a polyhydric alcohol or polyhydric phenol, and/or the higher molecular weight polyether diepoxide compound containing repeating ether groups, and (B) the monoepoxide component, e.g., a monoglycidyl ether, in a molar ratio of between about 0.2 and 10.0 moles of the diepoxide or diepoxide ether per mole of the monoepoxide or monoepoxide ether. Thereafter the polyol, described above, and the Lewis acid are admixed therewith. The polyol is emploeyd in an amount which provides between about 0.05 and about 1 hydroxyl group per oxirane group present in the epoxide mixture. By weight of the composition, the polyol is usually between about 1 and 35 percent. The amount of the Lewis acid added is usually between 0.005 and 0.3 percent by weight of the composition. The polyol and the Lewis acid may be premixed before admixture with the mixture of diepoxide and monoepoxide components, or they may be added in successive steps. The thus catalyzed admixture is then transfered to a mold for the prepartion of cast articles or is spread, rolled, or otherwise applied to surface to be laminated or coated thereby.

The composition so made upon standing preferably at somewhat above room temperature, cures to a clear, flexible adhesive thermoset resin. The length of time required for the composition to cure varies with the ingredients and relative proportions thereof employed and the temperature during the setting period. The rate of cure is usually considered a function of the gel time, i.e., the time required for the composition to thicken to a non-fluid state at substantially room temperature. The gel time is usually between about 1 minute and about 10 minutes, although a gel time of 20 minutes or longer is quite satisfactory. A complete cure requires a little more time beyond the gel state. The resin thus made in accordance with the invention, when evaluated according to A.S.T.M. standard tests, has physical properties of which the following are illustrative:

Shore A hardness—Below 100
Tensile strength—In excess of 100 p.s.i. and usually in excess of 1000 p.s.i., as high as 3000 p.s.i. being common
Elongation—At least 20 percent and usually in excess of 50 percent, frequently ranging about 300 percent.

By reference to the physical properties of the cured resin of the invention, it can be seen that a wide range of useful properties are obtained which may be varied in accordance with the specific reactants and the relative amounts thereof employed. All the physical properties fall within a range offering extensive utility. When glass plates either flat, or having mating curved faces, i.e., coinciding contours, are laminated with the resin having such properties, the resulting laminar structure is clear and transparent and transmits images therethrough without detectable diminution or distortion.

The following examples are illustrative of the practice of the invention.

EXAMPLE 1

An epoxy resin mixture was prepared by admixing 210 parts by weight of D.E.R. 332, 20 parts by weight of D.E.R. 661 (each having the epoxide equivalent weights within the ranges set out hereinbefore), and 27 parts by weight of phenylglycidyl ether. There was then admixed with the resulting mixture, at room temperature, a mixture consisting of 6.7 parts by weight of triethylene glycol and 0.071 part of $BF_3$. Sufficient stirring was administered to the composition to render it substantially unform. It was then transfered to a mold and cured. During cure the temperature rose to a maximum of 150° C. A satisfactory cure was obtained in 6 minutes. The composition thus made was a clear transparent flexible resin which was then tested and found to have the following physical properties:

Gardner color _____ <1
Shore A hardness _____ 97
Tensile strength _____p.s.i__ 3200
Elongation _____percent__ 50

EXAMPLE 2

An epoxy resin mixture was prepared by admixing, by weight, 10 parts of D.E.R. 332, 20 parts of D.E.R. 661, and 30 parts of phenylglycidyl ether. The purpose of this example was to show the effects of decreasing the proportion of diglycidyl ether, i.e., the D.E.R. 332 used here, and increasing the proportion of the higher molecular weight diglycidyl ether containing repeating ether groups, i.e., the D.E.R. 661 used here. To the admixture thus made were admixed, 5.5 parts of triethylene glycol and 0.065 part of $BF_3$. The mixture thus made was transferred to a mold at the ambient temperature of 25° C. The resin gelled in 4.6 minutes and cured in about 7 minutes. The resin thus made was clear, transparent and flexible. It was subsequently tested and found to have the following properties:

| | |
|---|---|
| Gardner color | <1 |
| Shore A hardness | 32 |
| Tensile strength p.s.i. | 175 |
| Elongation percent | 180 |

EXAMPLE 3

The diepoxide ether employed in this example consisted of only the higher molecular weight polyether. 25 parts of D.E.R. 661 and 25 parts by weight of phenylglycidyl ether were admixed in a reaction vessel of the type employed above and 0.052 part of $BF_3$, dispersed in 4 parts of triethylene glycol, were admixed therewith. The composition was then transferred to a cooling pan at the ambient temperature of 25° C. The composition gelled in 4.4 minutes and cured in 6 minutes. During cure the temperature, due to the exothermic nature of the curing reaction, reached a maximum temperature of 124° C. The resin thus made was clear, transparent and flexible. It was subsequently tested and showed the following properties:

| | |
|---|---|
| Shore A hardness | 55 |
| Tensile strength p.s.i. | 1000 |
| Elongation percent | 178 |
| Gardner color | <1 |

EXAMPLE 4

This example illustrates the use of (A) a mixture of diepoxide ethers consisting of the higher molecular weight polyether employed above and a diepoxide ether of a polyoxyalkylene glycol with (B) a monoepoxide ether. The ingredients were: (A) 15 parts of D.E.R. 661 and 5 parts of the diepoxide ether of polyoxypropylene glycol having an epoxide equivalent weight of about 330, and (B) 20 parts of phenylglycidyl ether. The ingredients were placed in a reaction vessel of the type used above and mixed to a substantial uniform consistency. To this mixture were then added (C) 3.3 parts of triethylene glycol containing (D) 0.043 part of $BF_3$. The admixture thus made was poured into a mold at ambient room temperature. It gelled in 7.1 minutes. Following cure, the resin so made was clear, transparent and flexible. It was tested and found to have the following properties:

| | |
|---|---|
| Shore A hardness | 25 |
| Tensile strength p.s.i. | 120 |
| Elongation percent | 195 |
| Gardner color | <1 |

EXAMPLE 5

This example illustrates the use of the same glycidyl ethers as were employed in Example 4 above but wherein a lower proportion of the D.E.R. 661 was employed and some D.E.R. 332 was employed with a monoepoxide ether of higher molecular weight. The ingredients consisted of 10.7 parts of the diepoxide ether of the polypropylene glycol employed in Example 4 above, 5.4 parts of D.E.R. 661, 3.23 parts of D.E.R. 332, and 3.23 parts of butylglycidyl ether. They were placed in a reaction vessel of the type employed above, admixed thoroughly, and 4.47 parts of triethylene glycol containing 0.05 part of $BF_3$ admixed therewith. The composition so made gelled in 1 minute and shortly thereafter cured to a transparent highly elastomeric resin having a Gardner color of 1.

The following additional examples of the practice of the invention were then carried out. The reactants and the amounts of each employed are set out in Table I below. The reactants were admixed substantially in accordance with the procedure following in the examples above.

TABLE I

[Parts by weight of reactants]

| Ex. No. | D.E.R. 332 | D.E.R. 661 | X* | Phenylglycidyl ether | Triethylene glycol | $BF_3$ |
|---|---|---|---|---|---|---|
| 6 | 80 | | | 20 | 11.2 | 0.08 |
| 7 | 70 | | | 30 | 27.2 | 0.10 |
| 8 | 65 | | | 35 | 27.4 | 0.10 |
| 9 | 50 | 20 | | 30 | 19.7 | 0.10 |
| 10 | 25 | 40 | | 35 | 16.9 | 0.10 |
| 11 | 40 | 30 | | 30 | 18.1 | 0.10 |
| 12 | 35 | 30 | | 35 | 23.5 | 0.08 |
| 13 | 4.4 | 13.3 | 26.6 | 4.0 | 3.0 | 0.05 |
| 14 | 4.4 | 13.3 | 26.6 | 8.0 | 3.5 | 0.05 |
| 15 | 4.4 | 13.3 | 26.6 | 12.0 | 2.5 | 0.06 |
| 16 | | 6.66 | 13.33 | 12.0 | 2.5 | 0.035 |
| 17 | | 15.0 | | 15.0 | 2.4 | 0.032 |
| 18 | | 10.0 | 10.0 | 16.0 | 2.9 | 0.04 |
| 19 | | 15.0 | 10.0 | 15.0 | 3.0 | 0.04 |
| 20 | | 15.0 | 10.0 | 20.0 | 3.6 | 0.05 |

*The diepoxide ether of polypropylene glycol having an epoxide equivalent weight of 330.

The compositions made containing the ingredients shown in Table I were cast into sheets or applied as laminants between solid plates. All of them cured relatively quickly to elastomeric transparent thermoset solid resins. Those employed as laminants showed high adhesion to solid surfaces and high strength against tear and rupture for resins possessing such high elastomeric properties.

EXAMPLE 21

To show the effect of variations in the amount of Lewis acid curing agent employed and the temperature during cure, the mixture employed in Example 1 was again prepared except that the amount of $BF_3$ catalyst employed and the temeprature during cure were varied in accordance with the conditions set out in Table II below:

TABLE II

| $BF_3$ | Gel Time in minutes at 25° C. | $BF_3$ | Gel Time in minutes at 40° C. |
|---|---|---|---|
| 0.05 | 15.5 | 0.05 | 20 |
| 0.075 | 4.5 | 0.07 | 2.66 |
| 0.10 | 2.75 | 0.09 | 1.25 |

It can be seen by reference to Table II that an increase in the proportion of the catalyst employed clearly reduces the gel time required for the resin. Reference to the table also shows that fast cures are obtained at substantially room temperature, viz., 25° C. but that where an accelerated cure is desired, a slight increase, e.g., 15 centigrade degrees, as shown in the table, markedly reduces the cure time needed.

It is seen from the examples that the composition of the invention is a strong and flexible resin, capable of withstanding shock, is of high clarity and meets the requirements for laminating glass articles to be used for viewing and optical purposes. The resin possesses a composite of strength and elastomeric properties heretofore unrealized in epoxy systems. The use of polyols, with the monoepoxide diepoxide composition, in combination with a small amount of a Lewis acid, offers a wide degree of control over the final resin products made.

To show the use of the resin composition of the invention for adhering a protective glass panel to the viewing face of a television tube, the following example was run.

EXAMPLE 22

A glass panel having a mating contour to that of the viewing face of a 23-inch television picture tube (having a deflection angle of the electron beam leaving the electron gun to the screen of 110°) was placed in fixed position at 59 mils (0.059 inch) from, and in alignment with, said viewing face. The assembly so made was heated to 60° C. A batch of the resin composition of the invention was prepared by admixing, by weight (A) 162.8 parts of D.E.R 332 and 162.8 parts of D.E.R. 661 and (B) 220 parts of phenylglycidyl ether. The mixture of epoxy ethers was then heated to 33° C. 54.6 parts of triethylene glycol containing 0.24 part (0.4 per cent by weight of the composition) of $BF_3$ were admixed therewith. The resulting curable mixture so made was allowed to reach a temperature of 55° C. and was then poured into the 59-mil space between the panel and television tube face. The resin gelled in about 5 minutes. After an additional 5 minutes cure time, the laminated structure so formed was examined and found to be clear and without noticeable color. It was upended and jostled about to simulate manual handling to which such equipment is normally subjected. There was no effect on the resin laminated structure. It was then alternately subjected to a temperature of −30° F. for one hour and then to a temperature of 158° F. for two hours. No adverse effects on the resin or the laminated structure resulted; the cohesion to the glass was unaffected and images were transmitted therethrough without any detectable effect thereon.

The invention having been described, what we claim and desire to protect by Letters Patent is:

1. A cured flexible elastomeric thermoset resin composition which is stable against deterioration when subjected to a temperature between about −30° F. and about 158° F., which forms highly tenacious bonds with solid surfaces in contact therewith during cure, and which does not visibly distort images viewed therethrough, consisting essentially of the reaction product of: (A) an epoxide component having an average of between about 1.5 and 2.0 terminal oxirane groups per molecule, of which said oxirane groups are the only functional groups thereof entering into said reaction, selected from the class consisting of oxides of cyclic and dicyclic diolefines, glycidyl ethers of polyhydric aliphatic alcohols having an epoxide equivalent weight of between about 115 and about 450, and glycidyl ethers and polyethers of polyhydric phenols having an epoxide equivalent weight of between about 174 and about 1,000, and mixtures of said epoxide components; (B) an epoxide component having an average of about one terminal oxirane group per mole, of which said oxirane group is the only functional group thereof entering into said reaction; (C) a polyol selected from the group consisting of ethylene glycol, polymethelyene glycols, glycerol, and polyoxalkylene glycols having the formula:

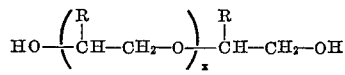

wherein R is selected from the class consisting of H and alkyl having from 2 to 6 carbon atoms and wherein $x$ in an integer of from 1 to 8; and (D) a Lewis acid in a molar ratio of between about 0.2 and 10.0 moles of component (A) per mole of component (B), an amount of component (C) sufficient to provide between about 0.05 and about 1 hydroxyl group per oxirane groups present in components (A) and (B), and an amount of Lewis acid to provide between about 0.005 and about 0.3 percent based on the total weight of said composition.

2. The composition of claim 1 wherein the epoxide component (A) is a mixture composed of between about 0.5 and 10.0 parts by weight of lower molecular weight epoxides, having an epoxide equivalent weight of between about 174 and about 193, per part higher molecular weight epoxides, having an epoxide equivalent weight of between about 230 and 975.

3. The composition of claim 2 wherein the epoxide component (A) wherein the lower molecular weight epoxide is the glycidyl ether of 4,4'-isopropylidenediphenol and the higher molecular weight epoxides are polyethers of 4,4'-isopropylidenediphenol having the formula:

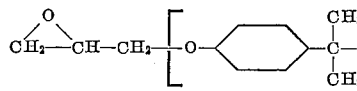 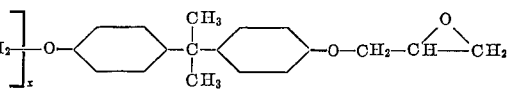

wherein $x$ is an integer from 1 to 10.

4. The resin of claim 1 wherein the polyol is a polyoxyalkylene glycol having a formulation:

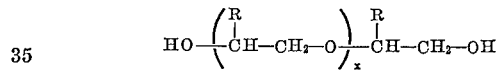

wherein R is selected from hydrogen and alkyl containing from 2 to 6 carbon atoms and $x$ is an integer of from 1 to 8.

5. The composition of claim 1 wherein the Lewis acid is selected from the class consisting of: $BF_3$, $SnCl_4$, $TeCl_3$, $AlCl_3$, $ZnCl_2$, and mixtures thereof.

References Cited by the Examiner

UNITED STATES PATENTS

| | | | |
|---|---|---|---|
| 2,512,996 | 6/1950 | Bixler | 260—47 |
| 2,528,932 | 11/1950 | Wiles et al. | 260—47 |
| 2,735,829 | 2/1956 | Wiles et al. | 260—47 |
| 2,824,083 | 2/1958 | Parry et al. | 260—47 |
| 3,087,060 | 4/1963 | Omohundro et al. | 260—47 |

FOREIGN PATENTS 133,819  8/1949  Australia.

OTHER REFERENCES

Grant: "Hackh's Chemical Dictionary," 3rd ed., McGraw-Hill Book Co., Inc., 1944; Page 310 relied on.

Lee et al.: "Epoxy Resins," published by McGraw-Hill Book Co., Inc., 1957 (pages 175 and 176 relied on).

WILLIAM H. SHORT, *Primary Examiner.*

HAROLD N. BURSTEIN, LOUISE P. QUAST,
*Examiners.*

A. L. LIBERMAN, T. D. KERWIN,
*Assistant Examiners.*